United States Patent Office 3,755,555
Patented Aug. 28, 1973

3,755,555
PRODUCTION OF ALKALI
HYDRIDOALUMINATES
Tatyana Nikolaevna Dymova, ulitsa Krasikova, 19, kv. 40, and Mariya Semenovna Roschina, ulitsa Gvardeiskaya, 14, kv. 227, both of Moscow; Nina Grigorievna Eliseeva, ulitsa Glavmosstroya, 7, korpus, 2, kv. 40, Moskovskaya Oblast; and Nikolai Tikhonovich Osipenko, ulitsa Gubkina, 16, korpus, 1, kv. 2, Moscow, U.S.S.R.
No Drawing. Filed Sept. 16, 1969, Ser. No. 858,498
Int. Cl. C01b 6/24
U.S. Cl. 423—644      7 Claims

ABSTRACT OF THE DISCLOSURE

A process for the production of alkali hydridoaluminates of the general formula $MAlH_4$ where M is sodium, potassium, rubidium or cesium characterized in that an alkali metal is reacted with aluminum and hydrogen in a melt of said alkali metal-hydridoaluminate, sodium being reacted with aluminium and hydrogen at a temperature of 200 to 350° C. under a pressure of 175 to 300 atm., and potassium, rubidium and cesium being reacted with aluminium and hydrogen at a temperature of 250 to 400° C. under a pressure of 100 to 250 atm.

---

The present invention relates to processes for the production of alkali hydridoaluminates of the general Formula $MAlH_4$, where M is sodium, potassium, rubidium or cesium. These hydridoaluminates, which can also be referred to as alkali metal aluminum hydrides, are characterized by thermal stability and fusibility and can be utilized for the production of other compounds of the hydride class and also as reducing agents and catalysts in the synthesis of compounds relating to high purity and pharmaceutical chemistry.

One known process for the production of alkali hydridoaluminates comprises heating alkali metals, such as sodium, potassium or cesium or their hydrides at 120–150° C. under pressure of hydrogen of 100 to 150 atm. with an excess of activated aluminum in a medium of a solvating or inert hydrocarbon in the presence of aluminum alkyls as activators.

Disadvantages of this previously known process are the considerable length of time required for the synthesis because of the slow reaction rate under the conditions specified in the process and also its multistage character.

The principal stages in the known process and the time required (hours) are as follows:

Activation of aluminum ---------------------- 6–12
Purification and drying of solvents ------------ 6–12
Hydrogenation ---------------------------- 6–18
Separation of the phases of the reaction mixture after hydrogenation by filtration or centrifuging, and washing to remove aluminum alkyls ------- 2–4
Distilling off solvents and recycling the same ----- 4–6

The time required for carrying out the process totals 24–52 hours, of which 6–18 hours are for the synthesis proper.

Another disadvantage of the known process is the use of large amounts of organic solvents (85–90%), necessitating the employment of cumbersome apparatus of large capacity with a complicated communication system and also resulting in low yields of hydridoaluminates per unit volume of the reaction apparatus.

Moreover, the use of organic solvents involves certain hazards because of the high temperature of the synthesis and the exothermic character of the reaction of hydridoaluminate formation. These conditions create a potential danger of explosive decomposition of the solvents by the hydridoaluminates, particularly when potassium or cesium hydridoaluminates are being produced. Such hydridoaluminates practically always cause partial splitting of the solvent, thus lowering the yield and impairing quality of the final product.

Yet another disadvantage of the known process is the necessity of using as activators expensive and extremely flammable aluminum alkyls in an amount of 5–10% of the weight of the alkali metal. In the absence of aluminum alkyls practically no hydridoaluminates are formed.

Another serious disadvantage of this known process is the necessity of using a large excess of aluminum (30–50% of the weight of the alkali metal) in order to convert all the alkali metal into the hydridoaluminate; the reaction being of a heterogeneous character. The large excess aluminum lowers the content of hydridoaluminate in the crude product and makes it exceedingly difficult to recover the pure hydridoaluminate. The particles of unreacted aluminum suspended in the liquid phase cannot be filtered out; neither settling nor even centrifuging can ensure complete clarification of the liquid.

Still another disadvantage of the known process is the relatively low quality of the products obtained after a single separation of the phases. These products are characterized by the low content of the desired substance (40–70%) and high pyrophoric properties. Moreover, said products cannot be utilized without preliminary purification because of the large amount of finely dispersed particles of aluminum they contain.

It is an object of the present invention to eliminate the foregoing disadvantages.

It is a further and more specific object of the invention to provide an economically sound process for the production of alkali hydridoaluminates in high yields suitable for use in various reactions without preliminary purification. Another object is that the process be simple from the engineering standpoint and from the standpoint of the equipment required.

These objects have been accomplished by the provisions of a process for the production of alkali hydridoaluminates of the general formula $MAlH_4$, where M is sodium, potassium, rubidium or cesium, involving the reaction of an alkali metal with aluminum and hydrogen at high temperatures and under high pressures, wherein, according to the invention, the reaction of said substances is carried out in a melt of the alkali metal-hydridoaluminate compound. When sodium hydridoaluminate is to be produced, sodium is reacted with aluminum and hydrogen at a temperature of 200–350° C. under a pressure of 175 to 300 atm.; when potassium, rubidium and cesium hydridoaluminates are to be produced, said alkali metals are reacted with aluminum and hydrogen at a temperature of 250–400° C. under a pressure of 100 to 250 atm.

In order to produce technical products with a high content of the desired substance which can be easily purified to a high degree of purity and will be suitable for use in reactions involving hydridoaluminates, the reaction of sodium with aluminum and hydrogen is advantageously carried out with aluminum being present in excess of 1 to 5 wt. percent to the stoichiometric amount of sodium, while the reaction of potassium, rubidium and cesium with aluminum and hydrogen is advantageously carried out with the aluminum in 3 to 10 wt. percent stoichiometric in excess to the amount of said alkali metals.

Chemically, the essence of the present process is the ability of alkali metals to react quickly with aluminum and hydrogen with the formation of hydridoaluminates at temperatures higher than the melting points of the hydridoaluminates and under pressures sufficient to suppress the dissociation of the hydridoaluminates at said temperatures.

The liquid state of the hydridoaluminates under a specified condition causes the rapid shift of the reaction towards the formation of hydridoaluminate and completion of the reaction with practically quantitative conversion of the alkali metal into hydridoaluminate, the reaction can be represented as follows:

$$M_{liq.} + Al_{solid} + 2H_{2(gas)} \rightarrow MAlH_{4(liq.)}$$

The present process of producing alkali hydridoaluminates is carried out as described below.

Into a rotating stainless steel autoclave are fed an alkali metal and powdered aluminum having a particle size up to 2 mm. The powdered aluminum is added in an amount to provide 1 to 10% excess over the expected amount of resulting alkali hydridoaluminate.. Hydrogen is then passed into the autoclave to a pressure of 100 to 300 atm. The mixture in the autoclave is heated with constant stirring to a temperature 30–50° C. higher than the melting point of the corresponding hydridoaluminate. This is accompanied by a sharp drop in pressure. When the pressure drop ceases, the temperature is raised further by 30–100° C., and the contents of the autoclave are held at this temperature for 0.5–1 hr., after which they are cooled to room temperature and the formed solid melt of the product is discharged.

Since the content of excess aluminum in the solid melt product is rather small, the pure hydridoaluminate is easily isolated by recrystallization from tetrahydrofuran or diglym (diethylene glycol dimethyl ether).

Thus, the present process is performed in a single stage, the stages of activation of aluminum, preparation of solvents, separation of the phases of the reaction mixture and regeneration of the solvents involved in the previously known process being eliminated.

The present invention provides high rate of hydridoaluminate formation, two to four times faster than that attained in the known process. The total time required for the synthesis of hydridoaluminates according to the present process is only ⅛ to 1/17 of that required when the previously known process is employed.

The elimination of organic solvents allows maximum simplification of the required equipment, reducing its volume to approximately 1/10 to 1/15 of that previously required, so that yield of hydroaluminate production per unit reaction volume is increased accordingly.

The present process is relatively safe since during the synthesis disssociation of hydridoaluminates and increase in pressure above that determined by the initial pressure of the hydrogen and the temperature are practically precluded.

The cost of hydridoaluminates produced by the present process is substantially reduced by the elimination of expensive aluminum alkyls.

According to the present invention hydridoaluminates are synthesized with metallic aluminum taken in amounts close to the stoichiometric (5–10 wt. percent excess with respect to the weight of the alkali metals), which is only ⅕ to 1/10 of the excess aluminum required in the previously known process.

The present process ensures the production of high quality products which are practically non-pyrophoric stable melts free from organic admixtures and which have a hydridoaluminate content of 85–95%. Such products are easy to handle and their storage presents no difficulties; moreover, they can be used in most reactions involving hydridoaluminates without preliminary purification.

The process of the present invention is illustrated in the following examples.

EXAMPLE 1

Into a 2 to 1 autoclave are placed 100 g. of sodium and 120 g. of aluminium powder containing 97% free aluminium, and hydrogen is passed into the autoclave a pressure of 300 atm. The contents of the autoclave are then heated with vigorous stirring to a temperature of 220° C. When the pressure ceases to fall, the temperature is raised to 260° C. and the mixture is held at this temperature for 1 hr.

The product obtained is 235 g. of a greyish-white melt containing 96% sodium hydridoaluminate.

After a single recrystallization from tetrahydrofuran a product is obtained assaying 99.7% sodium hydridoaluminate.

EXAMPLE 2

115 g. of sodium and 146 g. of aluminum are quickly heated in an autoclave to a temperature of 220° C., the temperature then rising spontaneously to 280° C. The process is carried out under a hydrogen pressure of 175 to 300 atm. and with constant stirring for 2 hrs. The temperature is then raised to 320–350° C. and the apparatus switched off in 30 min.

The product obtained is 275 g. of a melt containing 95% sodium hydridoaluminate.

After a single recrystallization from tetrahydrofuran a product is obtained assaying 99.5% sodium hydridoaluminate.

EXAMPLE 3

80 g. of potassium and 60 g. of aluminum are heated for 2 hrs. at 360° C., with stirring under hydrogen pressure of 200–250 atm.

The product obtained is 143 g. of a grey melt containing 94% potassium hydridoaluminate.

After a single recrystallization from diglym a product is obtained assaying 97% potassium hydridoaluminate.

EXAMPLE 4

4 g. of rubidium and 3 g. of aluminum are heated for 1.5 hrs. with stirring at 350–380° C. under hydrogen pressure of 200 atm.

The product obtained is a small ingot of rubidium hydridoaluminate assaying 85%.

EXAMPLE 5

14 g. of cesium and 30 g. of aluminum are heated for 3 hrs. with stirring at 380° C. under a hydrogen pressure of 250 atm.

The product obtained is 42 g. of a grey melt with a cesium hydridoaluminate content of 90%.

After a single recrystallization from diglym a product is obtained assaying 96% cesium hydridoaluminate.

Thus, the advantages of the present process for the synthesis of alkali hydridoaluminates reside in its rapidity and the high quality of the products obtained, as well as the maximum simplicity of the plant equipment required.

While the present invention has been described in accordance with a preferred embodiment, various changes and modifications may be made in carrying out the invention without departing from the spirit and scope thereof, as will be understood by those skilled in the art.

These changes and modifications are to be considered as falling within the spirit and scope of the invention as defined in the appended claims.

What is claimed is:

1. A process for the production of alkali metal hydridoaluminates of the general formula $MAlH_4$ where M is an alkali metal selected from the group consisting of sodium, potassium, rubidium, or cesium which comprises reacting said alkali metal with aluminum and hydrogen in a melt of said alkali metal-alkali metal hydridoaluminate at a temperature of 200° to 400° C. under a pressure of 100 to 300 atmospheres, said temperature being above the melting point of the corresponding alkali metal hydridoaluminate formed in the reaction and said pressure being sufficiently high to suppress the dissociation of the hydridoaluminate at said temperature.

2. A process according to claim 1, wherein the aluminum is a powder having a particle size up to 2 mm., and said aluminum powder is provided in 1 to 10% excess, based on the stoichiometric amount of said alkali metal.

3. A process according to claim 1, wherein M is sodium which comprises reacting sodium, aluminum and hydrogen at a temperature of 200° to 350° C. under a hydrogen pressure of 175 to 300 atm.

4. A process according to claim 3, wherein said aluminum is provided in excess of 1 to 5%, based on the stoichiometric amount of sodium.

5. A process according to claim 1, wherein M is an alkali metal selected from a group consisting of potassium, rubidium and cesium which comprises reacting said alkali metal with aluminum and hydrogen at a temperature of 250° to 400° C. under a pressure of 100 to 250 atm.

6. A process according to claim 5, wherein the said aluminum is provided in excess of 3 to 10%, based on the stoichiometric amount of said alkali metal.

7. A process for the production of alkali metal hydridoaluminates of the general formula $MalH_4$ where M is an alkali metal selected from the group consisting of sodium, potassium, rubidium, or cesium which comprises reacting said alkali metal with aluminum and hydrogen in a melt of said alkali metal-alkali metal hydridoaluminate in the absence of an organic diluent at a temperature of 200° to 400° C. under a pressure of 100 to 300 atmospheres, said temperature being above the melting point of the corresponding alkali metal hydridoaluminate formed in the reaction and said pressure being sufficiently high to suppress the dissociation of the hydridoaluminate at said temperature.

References Cited
UNITED STATES PATENTS

| | | | |
|---|---|---|---|
| 1,796,265 | 3/1931 | Fruedenberg et al. | 23—204 |
| 3,158,437 | 11/1964 | Del Guidice | 23—365 |
| 3,290,123 | 12/1966 | Del Guidice et al. | 23—365 |
| 3,387,933 | 6/1968 | Snyder | 23—204 |
| 3,505,036 | 4/1970 | Lindsay | 23—365 |

GEORGE O. PETERS, Primary Examiner